United States Patent [19]

Desrosier

[11] 4,132,809

[45] Jan. 2, 1979

[54] CONTEXTURED SEMIMOIST MEAT ANALOGS

[76] Inventor: Norman W. Desrosier, 18 Old Hill Farms Rd., Westport, Conn. 06880

[21] Appl. No.: 818,501

[22] Filed: Jul. 25, 1977

Related U.S. Application Data

[63] Continuation-in-part of Ser. No. 748,363, Dec. 7, 1976, abandoned.

[51] Int. Cl.$^2$ ............................ A23J 3/00; A23L 3/34
[52] U.S. Cl. ..................................... 426/104; 426/302; 426/334; 426/335; 426/532; 426/583; 426/588; 426/614; 426/641; 426/656; 426/657; 426/509; 426/802
[58] Field of Search ................. 426/99, 104, 302, 325, 426/326, 334, 583, 588, 614, 656, 657, 801, 335, 532, 641, 509, 802

[56] References Cited

U.S. PATENT DOCUMENTS

| | | | |
|---|---|---|---|
| 3,917,876 | 11/1975 | Harwood et al. | 426/656 X |
| 3,952,111 | 4/1976 | Desrosier | 426/656 X |
| 3,959,500 | 5/1976 | Bergman | 426/656 X |
| 4,000,323 | 12/1976 | Youngquist | 426/104 X |

*Primary Examiner*—Robert A. Yoncoskie

*Attorney, Agent, or Firm*—Charles E. Baxley

[57] ABSTRACT

This invention relates generally to formulation and manufacture of a meat substitute (and meat extender) base derived from textured soy protein particles and a "functional protein source" such as whey solids, skim milk solids, egg solids and/or wheat gluten to yield a cotextured particle which closely resembles freshly cooked ground meat, both as initially prepared and after prolonged cooking, and to a process for preserving same in a semimoist, ready to use condition. Textured soy protein particles are moisture cooked until soft and pliable in water containing 1% to 3% of common salt, dried to a moisture content of about 30% to 60%, and blended with the "functional protein source" and suitable humectants and antimycotics to develop a cotextured matrix by gentle kneading and grinding, and drying the particled matrix to a moisture content of about 20% to 35%, which is set by means of heat. When flavored, unique moist spongy texture of this product make it an excellent extender and tasty substitute, for natural beef or other meat, poultry or fish products. When fortified by selected vitamin, mineral and fat sources, the product becomes a meat substitute having handling qualities, taste and nutritional values closely resembling natural ground meats.

17 Claims, No Drawings

CONTEXTURED SEMIMOIST MEAT ANALOGS

CROSS REFERENCE

This is a continuation-in-part application with respect to my copending United States patent application Ser. No. 748,363 filed Dec. 7, 1976, now abandoned.

BACKGROUND OF THE INVENTION

Industrial production of textured soy proteins in the form of meatlike products has been underway for several decades. The literature is enormous. Soy protein is known to be plentiful and can be spun, extruded and fabricated into a wide variety of meat replacing products.

The best commercial soy based meat substitutes are expensive and perishable. These are sold either frozen or dry. In their frozen form they must be thawed to use. In their dry form they must be rehydrated to resemble meat. However, drying notably alters and diminishes quality. The poorer soy based meat substitutes are beany to taste, coarse in nature and are sold dry. They are not intended to be used alone.

It would be useful if an inexpensive soy based meat substitute could be manufactured which more closely resembles meat, and which could be maintained in such a condition that it could be used directly. In such a product four conditions would have to be met: (1) the food would have to be less expensive than the meat which it attempts to replace; (2) it should be so similar to meat in texture and moisture content as to permit use in the same manner that meat would be used; (3) it should have appropriate nutritional values; and (4) it should be stable in storage.

Existing art in producing commercial textured soy protein materials now is yielding increasingly palatable products. Bean flavors and tastes are being diminished. Protein content is increasing, now upwards of 70% and more. Price per pound is decreasing. Hence, the first condition above, is being resolved. Such available textured soy products, however, are spongelike in nature. As such, when they are squeezed with the fingers, for example, the liquid they contain when hydrated is readily released. It exudes too quickly to be similar to meat. With meat, such application of pressure results in some release of fluid or juice, but not as a sponge does.

Various mixtures of raw materials are being used to modify extruded soy product texture. Included is the wheat protein gluten. When gluten is added to a dry mix and the mix is then extruded, permanent alterations in the texture of the soy gluten base indeed result. Protein quality is also improved. However in so doing, the gluten is denatured in the extrusion process, and the finished product loses the ability to retain liquids which ability was exhibited originally by the starting materials.

All the presently used textured soy protein manufacturing steps result in an inadequate ability to retain water, water soluble and fat soluble materials. The soy protein is rendered insoluble. All thus result in finished meat substitutes which fail to perform as meat itself does. Because of this poor water retention there is also difficulty in retaining color necessary to create meat appearance, particularly in red meat.

THE INVENTION

I have found that starting with good commercial grades of textured soy protein, and combining same with larger amounts of a "functional protein source" such as whey solids, skim milk solids, egg solids and/or wheat gluten, it is possible to develop a permanent double textured or multiple textured system, one intermixed with the other, thereby increasing not only the density thereof but the texture or chewiness and the soluble solids retaining chracteristics as well. I call this a cotextured system. The resulting product not only better retains soluble solids and moisture, but it readily is flavored and colored to resemble meat very closely.

It is an object of this invention to provide a process for modifying the texture of soy protein bases such that they more closely resemble meat textures.

It is a further object of this invention to provide a cotextured system which has a spongy, meatlike texture, and which has incorporated therein suitable water soluble and fat soluble ingredients to transform the system into a functional meat substitute.

It is a further object of this invention to provide a process for making said meat substitute which yields a protein quality and quantity equal to that of casein, the milk protein, such that it will be a suitable substitute for meat in the dietary.

It is a further object of this invention to provide a process for producing said meat substitute which is both economical and practiced readily.

It is a further object of this invention to provide a process for making meat substitutes which can be used as replacements for a variety of meats.

It is still a further object of this invention to provide a process for making a meat substitute which is easily stored at room temperature for extended periods of time in ready to use condition.

DESCRIPTION OF PREFERRED EMBODIMENT OF INVENTION

Briefly, the process of this invention comprises the steps of moisture cooking textured soy protein particles in 1–3% salt (NaCl) water solution until the particles become soft and pliable; drying the cooked particles to a moisture content of 30–60%; dusting the wet flakes with 10–80% by weight of a "functional protein source", suitably whey solids, skim milk solids, egg solids and/or wheat gluten; kneading and grinding the matrix to wet and to disperse and to develop the "functional protein" structure intimately within the existing then open structure of the textured soy; heating the system to coagulate the functional proteins; and drying the matrix to a moisture content of 20–35%. Heating the system to above 150° F. sets or coagulates the functional protein so that it thereafter is bound together.

The basic process yields a meat substitute base which is superior nutritionally to soy flakes alone, may be eaten by itself, suitable, if supplemented with additives such as meat flavors, as a meat substitute, or may be mixed with natural meats to increase the quantities thereof. When the meat substitute of this invention is mixed with natural meat flavors, which are generally hydroscopic, the flavor substances may be added in dry powder form, dusted over the semimoist particles. The flavors dissolve in the surface moisture of the particles, and diffuse throughout the mass during storage. The addition of 1–10% humectant maintains the matrix in a pliable, chewy condition on prolonged storage.

Different varieties, colors and types of soy bases may be used in this process to produce improved meat substitutes. Therefore, the term "soy particles" shall be deemed to mean any of the commercial, textured soy protein bases, and the term "gluten" shall mean any commercial form of functional gluten, meaning that the gluten moiety retains its ability to become developed when wetted and kneaded, said development being intended to mean reorganization of the protein moiety, from its natural, tightly coiled molecular form.

Various proteinaceous materials, particularly of grain and plant origin, are capable of "filling" the spongy framework of the prepared soy bases, allowing the proteinaceous material to become wetted and integrated into a cotextured system. Powdered eggs (regular or with reduced cholesterol) and mixtures of gluten and animal proteins are further examples of proteinaceous materials that behave in this manner. Any functional animal protein isolate may be used so long as it has complementary qualities and meets governmental standards.

Thus the term "functional protein source" as used herein means any protein source which retains its water dispersing characteristics, and which, after being incorporated and dispersed in the prepared soy framework and then heated, becomes inextricably and irreversibly bound in the then cotextured system. However, gluten is the preferred "functional protein source" due to cost and compatibility with soy protein both from a nutritional point of view, and in generating desired meatlike textures, but all functional proteins are applicable.

The term "moisture cooking" as used herein shall be deemed to include boiling, or cooking in hot water, or steaming.

The nature of the invention and other objects and additional advantages thereof will be understood more readily by those skilled in the art after consideration of the following detailed description.

The raw material to make a beef analog for the process of this invention is textured soy protein particles, extracted to remove beany flavors and odors, caramel colored and containing in excess of about 44% protein. The soy protein particles are items of commerce and are recognized to have a spongy texture when suitably wet with water. The soy product should be generally free of bean hulls, be uniform in texture and low in extraneous materials.

The textured soy particles are boiled for 10 minutes in water containing 1-3% by weight of common salt (NaCl). The boiling causes the particles to swell and become slightly salty. It is essential that all particles be exposed to this treatment with dilute salt solution because it will become not only important in the final taste of the product, but essential in creating suitable preservative conditions later, after concentration by partial drying.

The particles next are drained and surface dried to remove excess moisture. This produces a moisture content in the range of about 30-60%, with an optimum near 45%. Drying is accomplished with conventional hot air driers, using forced air flow and a temperature of about 350° F., taking about 15-20 minutes or less.

The next step is to dust the semimoist particles with a functional protein source. Add 10-80% by weight. Mix thoroughly as the protein is added to insure adequate distribution throughout the base. (Excess powder will be wet and incorporatable as soon as more moisture is drawn from the interior of the particles.)

The coated particles next are allowed to stand for about 5 minutes, until the surfaces of the particles again are moistened by migration of water from the interiors of the particles.

The next step is gently to knead and grind the system, causing the mass to reorganize and the added protein to wet and disperse in and around the fibrous soy "sponge" filaments. This kneading and grinding is best done in one step, using the screw drive of a meat grinder as a kneading force and the grinding head as a physical dispersing force of the protein solution intimately within the fibrous soy "sponge". Care must be taken lest the soy particle structure be completely broken down by excessive working of the system. Dispersing of the added protein in the system is required, not disintegration. The proper point is reached when the exiting material from the grinder has the appearance of wetted coarse ground meat.

The next step is to break the system into particles by gentle tumbling, as in a rotating drum fitted with side ledges or flights, causing the rotating material to break into particles, resembling ground meat chunks.

The moisture content at this point must be below 35% and in the 20% to 35% range. If excess moisture is present, reduce it to below 35% using a conventional hot air drier, but with low heat and forced air. At this point the functional protein added has not been coagulated and the chunks still do not have the chew of meat. By balancing the moisture content of the surface dried soy particles with the amount of dry matter to be added, it is possible and practical to formulate product in such manner that no further drying at this stage is required.

The next step is to add suitable flavor to the particles. I will use beef as the example here, although any natural meat flavor may be used. Dust 2% to 10% dried natural beef flavor powder (commercial grade) while tumbling, to insure distribution of the flavor powder over the prepared particles. The addition of dry, natural beef flavor powder to the particles causes the particles to pick up the flavorings, and at the same time the color of the added ingredients.

The resulting product contains 2-6% salt concentration and 20-60% moisture content. The salt levels are increased in the finished product by concentration, in the drying step. A 100 gram sample of finished product would contain 2-6 grams of salt dissolved in 20-60 grams of water, creating a brine concentration of about 10% levels, recognized as the upper limit of outgrowth of anaerobic microorganisms forming spores of public health significance.

At this point in the process, a spray of humectant, i.e., propylene glycol, glycerol or corn syrup solids, etc., is applied, at the rate of 1-10% by weight to protect pliability in the finished product.

The next step is to preserve the meat flavored particles by packaging them into suitable containers, sealing, and heating the containers to an internal temperature of 190° F., then cooling. The heat treatment of the sealed containers is for insuring destruction of all vegetative microorganisms. During this step the cotextured system is also set. The structure thereafter is stable for use in cooking and the like.

The resulting products are free of health hazards and stable in storage at room temperature, are semimoist, chewy, and ready for use directly.

As an alternative preservative step it is possible to add a small amount of suitable antimycotic agent, such as 0.1% potassium sorbate to the salt brine solution during the initial boiling step, or in the humectant to be added. This will result in an antimycotic level in the finished product due to concentration during drying, suitable for protection of the product against aerobic microorganisms, molds, yeasts and osmophilic microorganisms which might have survived the process or been reinoculated for one reason or another during processing, or after opening the container in use. This would also permit packaging in inexpensive containers or packaging materials, and at room temperature, if so desired, after heat setting of proteins.

The foregoing describes the basic process for making artificial hamburger or hamburger substitute. By changing the nature of the ingredients used, particularly the natural protein flavor employed, it is possible to produce a wide variety of meat substitutes, such as pork, ham, bacon, poultry, fish, for example, wherein various colors may be used to advantage where appropriate.

The addition of colorants is best made at the point where the soy particles have been wet cooked. At this point, the texture is open and spongy, and the colorant easily penetrates into all parts of the mass.

The basic meat substitute of this process may be coated with edible fat and oil to increase the calorific loading of the food products. This is best accomplished as a final treatment, either by spraying with oil or by coating by tumbling in a container with fat.

From a nutritional point of view, it is desirable to adjust the protein efficiency ratio of the meat substitute to above 2.5, that of milk casein. This may be accomplished by balancing the portions of soy protein and functional protein supplements. Any of a wide range of commercial protein supplements are practical, depending on end use, including dried milk solids, dried whey solids, dried egg solids, dried meat products, fish protein, isolated vegetable protein and various plant and animal protein isolates, provided they are rich sources of sulfur containing amino acids.

In more complex formulations inclusion of special additives may also be appropriate. For example, addition of antioxidants is useful in certain applications to preserve freshness of fatty constituents of the meat substitute chunks, as is known to the art.

It should also be understood that it is possible to sheet the cotextured meat substitute base, then cut it into strips and cubes of various dimensions, etc., prior to setting the structure by heating it. In so doing meat substitute bases of differing composition and color can be combined as for example in random mixture to provide a "salamilike" product, or in alternating ribbons or stripes to provide a "baconlike" product.

The meat substitute products of this invention may be used in a wide variety of ways, much as natural meats are used. In the particled form they may be mixed with sauces, used in cookery as one would use meats, mixed with meats to extend them, used in sandwich spreads, mixed with other ingredients in making meal assemblies, etc.

The addition of an instantized beef flavored gravy to an equal volume of hamburger analog permits it to be formed into a pattie, then heated in a pan to make a flavorful, nutritious hot hamburgerlike sandwich. The addition of a hot cheese flavored sauce to the analog permits one to make a cheeseburgerlike sandwich, etc.

It is believed apparent that many changes could be made in the composition of the meat substitute products and in the process of making same and many seemingly different embodiments of this invention could be made without departing from the scope thereof. For example, one may choose to rehydrate the textured soy protein chunks in fresh functional protein systems, i.e., whole milk, eggs or water solutions of functional protein powders. Accordingly, it is intended that all matter contained in this description shall be interpreted as illustrative and not in any limiting sense.

I claim:

1. A process of making a meat analog and comprising steps as follows:
    moisture cooking textured soy protein particles in 1% of 3% by weight of common salt water solution until the particles become soft and pliable;
    drying the cooked particles to a moisture content of 30 to 60% to produce a matrix;
    adding to the matrix 10% to 80% by weight of a functional protein source selected from a group consisting of whey solids, skim milk solids, egg solids and wheat gluten;
    kneading and grinding the protein-matrix mixture to disperse and develop the functional protein source intimately within the matrix;
    rough grinding the kneaded and ground matrix so that it resembles ground meat chunks;
    adding to the rough ground matrix 1% to 10% by weight of an edible humectant;
    drying the rough ground humectant treated matrix to a moisture content of 20 to 35%; and then
    heating the dried humectant treated matrix at a temperature to set said mixture and to provide a meat analog product having moist chewy meatlike texture which persists in subsequent cooking.

2. The process claimed in claim 1 further comprising adding to the rough ground matrix prior to setting a flavoring amount of a natural meat or fish flavor.

3. The process claimed in claim 2 wherein prior to adding the meat or fish flavoring the protein efficiency ratio is adjusted to above 2.5 by addition of a suitable protein supplement.

4. The process claimed in claim 3 wherein the protein supplement comprises at least one member of the group consisting of dried milk solids, dried whey solids, dried egg solids, dried meat products, animal protein and vegetable protein all rich in sulfur containing amino acids.

5. The process claimed in claim 2 wherein the rough ground matrix, after addition of the meat flavor is coated lightly with edible fat or oil to increase the calorific loading of the food products.

6. The process claimed in claim 2 wherein prior to adding the meat or fish flavor the protein efficiency ratio is adjusted to above 2.5 by addition of protein supplements, and the matrix after mixing with meat flavor is lightly coated with edible fat or oil.

7. The process claimed in claim 2 further comprising adding an antimycotic agent during the moisture cooking of said soy protein particles to permit packaging of said meat analog at room temperature.

8. The process claimed in claim 2 further comprising packaging the meat analog product in containers which are then sealed and heating the sealed containers to about 190° F. to preserve said meat analog product.

9. The process claimed in claim 2 wherein the heating of the matrix is to a temperature of above 150° F.

10. A process of making a meat analog which simulates fresh ground beef, the process comprising steps as follows:
    moisture cooking textured soy protein particles in 1% to 3% by weight common salt water solution until the particles become soft and pliable;
    drying the cooked particles to a moisture content of 30% to 60% to produce a matrix;

adding to the matrix 10% to 80% by weight of a functional protein source selected from a group consisting of whey solids, skim milk solids, egg solids and wheat gluten;

kneading and grinding the protein-matrix mixture to disperse and develop the functional protein source intimately within the matrix;

gently tumbling the kneaded and ground matrix to give it a consistency and appearance of ground beef chunks;

adding to the kneaded and ground matrix during the tumbling flavoring amounts of a natural beef flavor;

adding 1% to 10% by weight of an edible humectant to the tumbled matrix;

drying the tumbled humectant treated matrix to a moisture content of 20% to 35%; then heating the dried humectant treated matrix at a temperature to set said mixture and to provide a meat analog product having moist chewy meatlike texture which persists in subsequent cooking.

11. The process claimed in claim 10 wherein prior to adding the beef flavor the protein efficiency is adjusted to above 2.5 by addition of a protein supplement.

12. The process claimed in claim 11 wherein the matrix after the adding of the beef flavor is lightly coated with edible fat or oil to increase the calorific loading of the food product.

13. A meat analog product prepared by a process comprising the following steps:

moisture cooking textured soy protein particles in 1% to 3% by weight common salt water solution until the particles become soft and pliable;

drying the cooked particles to a moisture content of 30% to 60% to produce a matrix;

adding to the matrix 10% to 80% by weight of a functional protein source selected from a group consisting of whey solids, skim milk solids, egg solids and wheat gluten;

kneading and grinding the protein-matrix mixture to disperse and develop the functional protein source intimately within the structure of the particles comprising the matrix;

adding 1% to 10% by weight of a suitable humectant to the kneaded and ground matrix;

forming the humectant treated kneaded and ground matrix into particles resembling small ground meat chunks;

drying the particled matrix to a moisture content of 20% to 35% to produce a cotextured matrix;

heating the cotextured matrix at a temperature to set said mixture and to provide a moist chewy meatlike texture which persists in subsequent cooking.

14. A meat analog product as claimed in claim 13 further comprising mixing a flavoring amount of natural meat flavor with the particled matrix.

15. A meat analog product as claimed in claim 14 further comprising a protein supplement mixed with particled matrix prior to adding the natural meat flavoring to increase the protein efficiency ratio of the cotextured matrix product.

16. A meat analog product as claimed in claim 15 further comprising edible fat or oil lightly coated on the particled matrix after adding said meat flavoring to increase the calorific loading of the food product.

17. A meat analog product as claimed in claim 13 wherein wheat gluten is the functional protein source.

* * * * *